United States Patent [19]

Forest et al.

[11] 3,961,092

[45] June 1, 1976

[54] METHOD FOR PRESERVING HIGH MOISTURE CONTENT AGRICULTURAL GRAINS

[76] Inventors: Joseph G. Forest, P.O. Box 367, Waverly, N.Y. 14892; Edward J. Czarnetzky, P.O. Box 330, Chazy, N.Y. 12921

[22] Filed: Apr. 3, 1975

[21] Appl. No.: 564,818

Related U.S. Application Data

[63] Continuation-in-part of Ser. No. 466,778, May 3, 1974, abandoned.

[52] U.S. Cl. ............................ 426/331; 426/335; 426/532; 426/626
[51] Int. Cl.² ............................................ A21D 4/00
[58] Field of Search .................... 252/400 R, 402; 426/133, 309, 310, 321, 328, 331, 335, 532, 618, 626, 623, 635, 89, 93, 302; 424/127, 128, 317

[56] References Cited

UNITED STATES PATENTS

| | | | |
|---|---|---|---|
| 2,890,120 | 6/1959 | Makower | 426/532 |
| 3,299,073 | 1/1967 | Wakeman | 426/532 |
| 3,317,540 | 5/1967 | Wakeman | 426/532 |
| 3,682,653 | 8/1972 | Mommer | 426/532 |
| 3,697,651 | 10/1972 | Khan | 424/128 |

*Primary Examiner*—Charles N. Hart
*Assistant Examiner*—Ernest G. Therkorn
*Attorney, Agent, or Firm*—Sughrue, Rothwell, Mion, Zinn and Macpeak

[57] ABSTRACT

There is provided, a method for preserving high moisture content agricultural grains, which comprises treating such grains with a composition consisting essentially of (1) an organic foodgrade acid or phosphoric acid, and (2) a synthetic organic cationic or anionic surfactant for enhancing the penetration of said acid into and through said grains.

1 Claim, No Drawings

3,961,092

METHOD FOR PRESERVING HIGH MOISTURE CONTENT AGRICULTURAL GRAINS

CROSS-REFERENCE TO RELATED APPLICATIONS

This application is a continuation-in-part application of our earlier co-pending application Ser. No. 466,778, filed May 3, 1974, now abandoned.

BACKGROUND OF THE INVENTION

1. Field of the Invention

The present invention is directed to a method for preserving high moisture content agricultural grains which become subject to bacterial degradation due to the high moisture content present. More particularly, the present invention is directed to a method for preserving such high moisture content agricultural grains by treating said grains with a specific acid/surfactant admixture.

2. Description of the Prior Art

U.S. Pat. No. 3,682,653 discloses the use of a surfactant and propionic acid, in combination, as a grain conditioner lubricant for softening a mass of whole kernel grains. Essentially, the patentee employs a mixture of liquid lecithin, propionic acid, and water. The propionic acid serves to reduce the pH of the lecithin such that the lecithin becomes water dispersible.

The invention of this patent is quite different from that disclosed and claimed herein for a number of reasons. Firstly, the patentee is not at all concerned with the preservation of high moisture content grains. Secondly, the patentee requires the presence of a natural amphoteric surfactant (lecithin), whereas, as will be seen from the discussion which follows, a synthetic organic cationic or anionic surfactant is required for the instant invention to enhance the spreading factor of the acid contained in the present composition required to preserve the high moisture content grains. Non-ionic of amphoteric surfactants will not suffice to this end. Thirdly, one observes upon a reading of this patent, that the patentee requires propionic acid for the purpose of dispersing the lecithin, whereas in the instant invention, the surfactant is employed for the sole purpose of dispersing the acid of the present composition in the high moisture content grain for preservation purposes.

Finally, according to the patentee, one-fourth lb. of acid per ton of grain would be required, whereas with the present invention, appreciably more acid per ton is required, and as such, the patentee's acid content would be so minimal as to prevent preservation of the high moisture content grain.

U.S. Pat. No. 2,890,120 discloses a method for preserving edible plant materials, i.e., fruits and vegetables which become deteriorated via enzyme deterioration. Specifically, the method includes applying to said plant materials, a composition containing at least an acid, a volatile oxygenated organic solvent and a surfactant. The invention of this patentee is distinguished from the invention disclosed and claimed herein on at least two bases. Firstly, the plant materials of the patentee are deteriorated via enzymes whereas the grain material disclosed in the instant invention is deteriorated through bacteria as a result of the high moisture content present. Secondly, the patentee requires the presence of a volatile oxygenated organic solvent for two reasons: (1) to facilitate the penetration of the patentee's acid through the cell walls and membranes of his plant materials, and (2) for acting synergistically with the other components of the patentee's solution to promote enzyme inactivation. In the instant invention, no volatile oxygenated organic solvent is at all required. In fact, to employ such would be detrimental to the purposes intended to be achieved by the present inventors.

SUMMARY OF THE INVENTION

It is the primary object of the present invention to provide a method for preserving high moisture content agricultural grains.

Accordingly, to this end, it is intended for the purpose of this invention, to employ a high moisture content agricultural grain preserving composition, which consists essentially of: (1) a food-grade organic acid, or phosphoric acid, and (2) a synthetic organic cationic or anionic surfactant for enhancing the penetration of the acid employed in this composition into the high moisture content grain, thus effecting preservation of the same. Nonionic and amphoteric surfactants will not suffice.

By way of definition, the term "food-grade organic acid" refers to conventional organic acids known and approved for use with food products.

The term "high moisture" as it pertains to agricultural grains means any agricultural grain whose moisture content is 18% or more.

DETAILED DESCRIPTION OF THE INVENTION

With respect to the food-grade organic acids suitable for the purpose of this invention, those acids which are preferred, are those of formic acid, acetic acid, propionic acid, and lactic acid. Of these, propionic acid is the acid of choice because it not only serves the function required of an acid for the purpose of this invention, but, in addition, this particular acid is an effective fungicide and as such, enhances the preservation power of the composition employed. However, any other food-grade organic acid approved for use by the Food and Drug Administration's "GRAS" list is acceptable also.

With respect to the concentration parameters for the acids and surfactants employed in the present composition, naturally, the concentration of same will vary over wide limits, depending upon the moisture content of grain treated. However, generally, the following guidelines are suggested.

For one ton of grain containing 25% moisture content, the following active ingredient concentrations are suitable for applicants' purposes:

1. Acid—10 lbs.
2. Surfactant—2 lbs.

Similarly, for 1 ton of grain having a moisture content of 15%, the following active ingredient concentrations are suitable:

1. Acid—2½ lbs.
2. Surfactant—7/10 lb.

Referring to the above examples, with respect to the grain having a moisture content of 25%, 12% of that moisture is inactive. Consequently, the amount of active water in the 25% moisture grain is actually 13% (25–12%).

Similarly, with respect to the grain having a 15% moisture content, the amount of active moisture contained in said grain would be 3% (15–12%).

Accordingly, 15% moisture grain required 3/13 times the formula or roughly one-fourth of the formula used for application to a 25% moisture grain. This is based on perfect mixing conditions. For practical purposes it may be necessary to use an inert diluent. Based on the foregoing guidelines, it is believed that the skilled artisan can easily calculate the amount of acid and surfactant required for applicants' purposes simply by determining the amount of moisture content contained in a particular grain and calculating the amount of each active ingredient required on a proportional basis in light of the above guidelines.

With respect to the surfactants suitable for applicants' purposes, applicants do not limit themselves to any particular cationic or anionic surfactant. That is, virtually any of these will suffice. However, without limitation, the following commercially available surfactants have been found to be quite suitable. Any sodium alkylsulfonethanolamine; any ammonium or sodium alkylarylpolyethersulfonate (Triton); any long alkyl chain sulfonate; any alkyl aryl sulfonate; any sulfonated fatty acid; or any sodium sulfosuccinate. Specific illustrative examples of the following aforementioned types of surfactants are: sodium dodecylsulfonethanolamine, ammonium dodecylbenzenepolyethersulfonate, sodium dodecylbenzenepolyethersulfonate, dodecylsulfonate, sodium dodecylbenzenesulfonate, sulfonated myristic acid, sulfonated palmitic acid, sulfonated stearic acid and di(2-ethylhexyl)sodium sulfosuccinate. These and other cationic and anionic surfactants useful in the instant invention are found and described in the text entitled "ENCYCLOPEDIA OF SURFACE ACTIVE AGENTS," by Sisley and Wood, published by Chemical Publishing Company, New York, N.Y. (1964).

Naturally, for the purpose of this invention, more than one food-grade acid can be employed; that is, mixtures of conventionally acceptable food-grade acids are equally as suitable for the purposes of this invention.

With the foregoing in mind, the following brief explanation will provide the skilled artisan with a basis to fully understand the uniqueness and novelty of the present invention.

Firstly, the basis of this invention is the realization that food-grade acids can be used to preserve high moisture content grain, such as corn grain or any other agricultural grain. However, a problem arises when using such an acid and mainly, the acid alone cannot normally penetrate or permeate through the high moisture content grain sufficiently to impart this preservation effect.

Consequently, the uniqueness of the instant invention is the realization that when a conventional food-grade acid and a synthetic organic cationic or anionic surfactant capable of enhancing penetration of that acid through high moisture content grains are administered concomitantly the surfactant enables the food-grade acid to fully penetrate throughout the high moisture content grains so as to permit an overall substantial preservative effect to be achieved.

In application, one simply determines the amount of high moisture content grains to be treated as well as the amount of moisture contained in that grain. The amount of moisture contained in a particular grain can be easily determined by means well known to the skilled artisan concerned with the subject matter of this invention. Subsequently, based upon these estimations, the basic formulation of the present invention is prepared by simply mixing together the essential ingredients. Then, the prepared formulation is applied to the high moisture content grain by any suitable means, for example, spraying the same onto the grain mass, until the high moisture content grain is saturated with the formulation.

A better understanding of the present invention will be gained from the following examples, which are simply illustrative and non-limitative thereof.

EXAMPLE I

This example, set out in two parts (part A and part B) illustrates the "spreading factor" discussed in connection with the formulation of this invention.

Part A. (Rate of penetration of the acid through the grain mass; the SPREADING FACTOR)

| Formulation | | Inches per Hour |
|---|---|---|
| 50% | Propionic acid | 5.0 |
| 50% | Mixture of Propionic acid (60%) | 5.1 |
| | and Acetic acid (40%) | 5.1 |
| 50% | Acetic acid | 5.2 |
| 50% | Propionic acid and 1/10% sodium alkylsulfonethanolamine* | 7.5 |

Each of the above formulations were diluted with distilled water to the required percent. 35mm. Pyrex tubes (specially prepared) were employed. High moisture corn (25%) was packed in the tubes at 5 lbs. per square inch at each inch level. All experiments were conducted at 70° F. These values hold only for the particular batch of corn used and are not absolute, and vary with the degree of attrition if ground.

Part B. (Rate of penetration of the acid through the grain kernal; the "ABSORPTION FACTOR")

| Formulation | | Percent Absorption in Hours | | | | | |
|---|---|---|---|---|---|---|---|
| | | ½ | 1 | 2 | 4 | 12 | 24 |
| 50% | Propionic acid | 20 | 24 | 28 | 28 | 30 | 37 |
| 50% | Propionic acid/Acetic acid- 60/40 mixture | 19 | 23 | 26 | 29 | 32 | 35 |
| 50% | Acetic acid | 25 | 31 | 34 | 36 | 40 | 45 |
| 50% | Propionic acid and 1/10% sodium alkylsulfonethanolamine* | 30 | 38 | 35 | 56 | 64 | 75 |

*sodium dodecylsulfonethanolamine

In the above comparative studies, 100 gram portions of the 25% moisture corn were employed. The various test liquids were mixed at the rate of 1% with the grain mass. The preparation was allowed to stand for the varying time periods noted at 50° F. The test liquids were then eluted from the grain with three successive washes of distilled water. Aliquots were titrated for acid not absorbed and calculations were noted for the percent of acid absorbed. These values are not absolute and hold only for the particular batch of corn used, and vary with the degree of attrition if ground.

EXAMPLE II

Growth of Mold in OF MOLD IN 30% High Moisture Corn at 70° F

| Formulation | | Days 4 | 14 | 28 | 80 |
|---|---|---|---|---|---|
| ½% - | Propionic acid | 0 | 1 | 2 | 3 |
| ¼% - | Propionic Acid | 1 | 2 | 4 | 4 |
| ½% - | Propionic acid and 1/10% sodium alkylsulfonethanolamine* | 0 | 0 | 1 | 2 |
| ¼% - | Propionic acid and 1/10% sodium alkylsulfonethanolamine* | 0 | 0 | 2 | 4 |

In the above comparisons, 200 gram samples in wide mouth jars with loose lids were allowed to stand over water in a loose-lidded container at 70° F. The growth of mold in the high moisture corn employed was then determined. The degree of mold growth ranged from 0 or no growth to 4 or maximum growth.

EXAMPLE III

With respect to the surfactants illustrated previously and used for present purposes, the following data, set out in Table I below is pertinent from the standpoint of demonstrating the ability of the same to enhance acid penetration.

TABLE I

| Surfactant | Percent Absorption |
|---|---|
| Sodium alkylsulfonethanolamine*+propionic acid (50%) | 75 |
| Ammonium alkylarylpolyethersulfonate[1]+propionic acid (50%) | 79 |
| Sodium alkylarylpolyethersulfonate[2]+propionic acid (50%) | 77 |
| Sulfonated fatty acid[3]+propionic acid (50%) | 68 |
| Propionic acid by itself (50%) | 33 |

Conditions same as in Example I, Part B.

*Sodium dodecylsulfonethanolamine
[1]Ammonium dodecylbenzenepolyethersulfonate
[2]Sodium dodecylbenzenepolyethersulfonate
[3]Sulfonated palmitic acid These values are not absolute and serve only as examples as they vary with the particular batch of corn used, and degree of attrition if ground. These are weighted values based on the surfactant employed and propionic acid.

Although the present invention has been adequately described in the foregoing specification and examples included therein, it is obviously apparent that various changes and/or modifications can be made thereto without departing from the spirit and scope thereof.

What we claim is:

1. A method for preserving high moisture content agricultural grain from bacterial degradation which comprises: applying to said grain, an antibacterial effective amount of a composition consisting essentially of:
   1. water,
   2. an acid member selected from the group consisting of formic acid, acetic acid, propionic acid, and phosphoric acid, and
   3. a synthetic organic cationic or anionic surfactant selected from the group consisting of sodium alkylsulfonethanolamine, ammonium alkylarylpolyethersulfonate, sodium alkylarylpolyethersulfonate, and a sulfonated fatty acid, whereby said surfactant enhances the penetration of said acid member of (2) into and throughout said high moisture content grain.

* * * * *